US007185092B2

(12) United States Patent
Furui et al.

(10) Patent No.: US 7,185,092 B2
(45) Date of Patent: Feb. 27, 2007

(54) WEB SITE, INFORMATION COMMUNICATION TERMINAL, ROBOT SEARCH ENGINE RESPONSE SYSTEM, ROBOT SEARCH ENGINE REGISTRATION METHOD, AND STORAGE MEDIUM AND PROGRAM TRANSMISSION APPARATUS THEREFOR

(75) Inventors: Yohnosuke Furui, Yamato (JP); Junichi Takahashi, Tokyo-to (JP)

(73) Assignee: International Business Machines Corporation, Armonk, NY (US)

( * ) Notice: Subject to any disclaimer, the term of this patent is extended or adjusted under 35 U.S.C. 154(b) by 723 days.

(21) Appl. No.: 09/854,617

(22) Filed: May 14, 2001

(65) Prior Publication Data

US 2002/0169875 A1 Nov. 14, 2002

(30) Foreign Application Priority Data

May 15, 2000 (JP) .............................. 2000-142110

(51) Int. Cl.
*G06F 15/16* (2006.01)
*G06F 15/173* (2006.01)
*G06F 17/30* (2006.01)
*H04L 9/32* (2006.01)
*G06K 19/00* (2006.01)
*H04K 1/00* (2006.01)
*H03M 1/68* (2006.01)
*G06F 7/00* (2006.01)
*G06F 7/04* (2006.01)
*G06F 7/58* (2006.01)
*H04L 9/00* (2006.01)
*G06K 9/00* (2006.01)
*G06Q 99/00* (2006.01)
*H04N 7/16* (2006.01)

(52) U.S. Cl. ...................... 709/225; 709/203; 709/219; 709/229; 705/51; 705/57; 707/3; 707/4; 707/9; 707/10; 707/104.1; 726/3; 726/5; 726/27; 726/29

(58) Field of Classification Search ................ 709/203, 709/219, 225, 226, 229; 705/10, 104.1, 51, 705/57; 707/3–6, 9, 10, 104.1; 713/202
See application file for complete search history.

(56) References Cited

U.S. PATENT DOCUMENTS 5,721,906 A * 2/1998 Siefert ........................... 707/9

(Continued)

FOREIGN PATENT DOCUMENTS

| JP | 07-240881 | 12/1995 |
|----|-----------|---------|
| JP | 2000076300 | 3/2000 |

OTHER PUBLICATIONS

English Abstract.
"A Contents Distribution System for Digital Library" Nov. 30, 1999. IPSJ SIG Notes vol. 99. No. 102. pp. 81-89.

*Primary Examiner*—Jason Cardone
*Assistant Examiner*—Melvin H. Pollack
(74) *Attorney, Agent, or Firm*—F. Chau & Associates LLC

(57) ABSTRACT

A web site 10 is provided in a communication network to enable the selective provision of appropriate information, by a site whereat only limited access is permitted, in consonance with the access right of the source of a request for information.

comprises: a data management system 19; a user agent determination module 12, for ascertaining the type of a transmission source from which an access request is received; and response generation modules 15 to 18, for acquiring, from the data management system 19, information that is correlated with the type of the transmission source, and for generating and returning a response, wherein the data management system 19 stores main information 19a, for which access is limited, and metadata 19b, which is information describing the main information 19a.

9 Claims, 14 Drawing Sheets

U.S. PATENT DOCUMENTS

| | | | |
|---|---|---|---|
| 5,752,238 A * | 5/1998 | Dedrick ........................ | 705/14 |
| 5,845,067 A * | 12/1998 | Porter et al. ................ | 713/200 |
| 5,892,900 A * | 4/1999 | Ginter et al. ................ | 713/200 |
| 5,941,947 A * | 8/1999 | Brown et al. ................ | 709/225 |
| 6,006,217 A * | 12/1999 | Lumsden ....................... | 707/2 |
| 6,151,584 A * | 11/2000 | Papierniak et al. ............ | 705/10 |
| 6,212,545 B1 * | 4/2001 | Ohtani et al. ................ | 709/202 |
| 6,236,991 B1 * | 5/2001 | Frauenhofer et al. ........... | 707/6 |
| 6,272,535 B1 * | 8/2001 | Iwamura ...................... | 709/217 |
| 6,327,594 B1 * | 12/2001 | Van Huben et al. ......... | 707/200 |
| 6,405,245 B1 * | 6/2002 | Burson et al. ............... | 709/217 |
| 6,513,117 B2 * | 1/2003 | Tarpenning et al. ......... | 713/156 |
| 6,517,587 B2 * | 2/2003 | Satyavolu et al. ....... | 715/501.1 |
| 6,526,438 B1 * | 2/2003 | Bienvenu et al. ........... | 709/219 |
| 6,546,555 B1 * | 4/2003 | Hjelsvold et al. ............... | 725/1 |
| 6,571,256 B1 * | 5/2003 | Dorian et al. ............ | 707/104.1 |
| 6,631,369 B1 * | 10/2003 | Meyerzon et al. ............. | 707/4 |
| 6,654,754 B1 * | 11/2003 | Knauft et al. ............... | 707/100 |
| 6,662,230 B1 * | 12/2003 | Eichstaedt et al. .......... | 709/229 |
| 6,681,227 B1 * | 1/2004 | Kojima et al. ................ | 707/10 |
| 6,694,365 B1 * | 2/2004 | Wyngarden ................. | 709/225 |
| 6,697,824 B1 * | 2/2004 | Bowman-Amuah ......... | 709/229 |
| 6,701,307 B2 * | 3/2004 | Himmelstein et al. ......... | 707/3 |
| 6,701,314 B1 * | 3/2004 | Conover et al. ............... | 707/7 |
| 6,772,139 B1 * | 8/2004 | Smith, III ..................... | 707/3 |
| 6,820,063 B1 * | 11/2004 | England et al. ............... | 705/54 |
| 6,907,423 B2 * | 6/2005 | Weil et al. ..................... | 707/3 |

* cited by examiner

```
GET /index.html HTTP/1.0
Referer: http://www.ibm.co.jp/
User-Agent: Mozilla/4.7 [ja] (Win98; I)
Host: www.ibm.co.jp
Accept: image/gif, image/x-xbitmap, image/jpeg, image/pjpeg, image/png, */*
Accept-Encoding: gzip
Accept-Language: ja
Accept-Charset: Shift_JIS,*,utf-8
Accept-Encoding:
```

```
<Educational material>
    Abstract:    This page is an educational material of physics that describes
                 the relationship between the speed of light and gravity.
    Keywords:    Einstein, speed, light, gravity
    Category:    Physics
    Importance:  B (pretty important)

<Static image>
    Importance:  C (average)

<Movie>
    Abstract:    The principal is depitced in one-minute movie.
    Importance:  A (extremely important)

<Narration>
    Importance:  B (pretty important)
```

```
GET edu.html HTTP/1.0
User-Agent: <User_Agent>
Host: www.dummy.com
Accept-Language: ja
Cookie: userid=<User_ID>
```

Fig. 6

| User agent | Agent type |
|---|---|
| im_robot (ver. 1.0) | Search engine |
| xx_robot (ver. 1.0) | Search engine |
| John_Doe browser (ver. 1.0) | Web browser |
| Dickescape browser (ver. 2.0) | Web browser |

Fig. 7

| User ID | User type | Password |
|---|---|---|
| smith | Guest user | |
| mcfly | Registered user | im25marty |

```
HTTP/1.0 200 OK
Content-Length: 78
Content-Type: text/html

<html><body>Physics, Einstein, speed, light, gravity</body></html>
```

Fig. 10

| URL | Keyword |
|---|---|
| http://www.dummy.com/edu.html | einstein, gravity, light, physics, speed |
| http://www.dummy.com/edu2.html | mathmatics, formula |
| http://www.dummy.com/edu3.html | history |

```
<a href=http://www.dummy.com/edu.html>http://www.dummy.com/edu.html</a>
```

Fig. 11

```
HTTP/1.0 200 OK
Content-Length: 284
Content-Type: text/html

<html><body><h1>Physics</h1>
<p>This page is an educational material of physics that describes
the relationship between the speed of light and gravity.</p>
<p><b>Keywords:</b> Einstein, speed, light, gravity</p>
<p><hr>
<p>Click <a href="ad.html">here</a>.</p>
</body></html>
```

```
HTTP/1.0 200 OK
Content-Length: 146
Content-Type: text/html
Set-Cookie: userid=anderson; path=/; expires=Wednesday, 09-Nov-99 23:12:40 GMT <html><body><h1>Welcome to our classroom</h1>
<p>Now you are one of our guests!</p>
<p>
<p>Click <a href="edu.html">here</a>.
</body></html>
```

| User ID | User type | Password |
|---|---|---|
| smith | Guest user | |
| mcfly | Registered user | im25marty |
| anderson | Guest user | |

Fig. 14

```
HTTP/1.0 200 OK
Content-Length: 489
Content-Type: text/html

<html><body><h1>Physics</h1>
<p>This page is an educational material of physics that describes
the relationship between the speed of light and gravity.</p>
<p>(blah, blah, blah...)</p>
<p>(blah, blah, blah...)</p>
<img src="image.gif">
<p>(blah, blah, blah...)</p>
<p>The principal is depitced in one-minute movie.</p>
<embed src="narration.au">
<p>(blah, blah, blah...)</p>
<p>(blah, blah, blah...)</p>
<p><hr>
<p>Click <a href="contract.html">here</a>.</p>
</body></html>
```

Fig. 15

| User ID | User type | Password |
|---|---|---|
| smith | Guest user | |
| mcfly | Registered user | im25marty |
| anderson | Registered user | ok5gogo |

Fig. 16

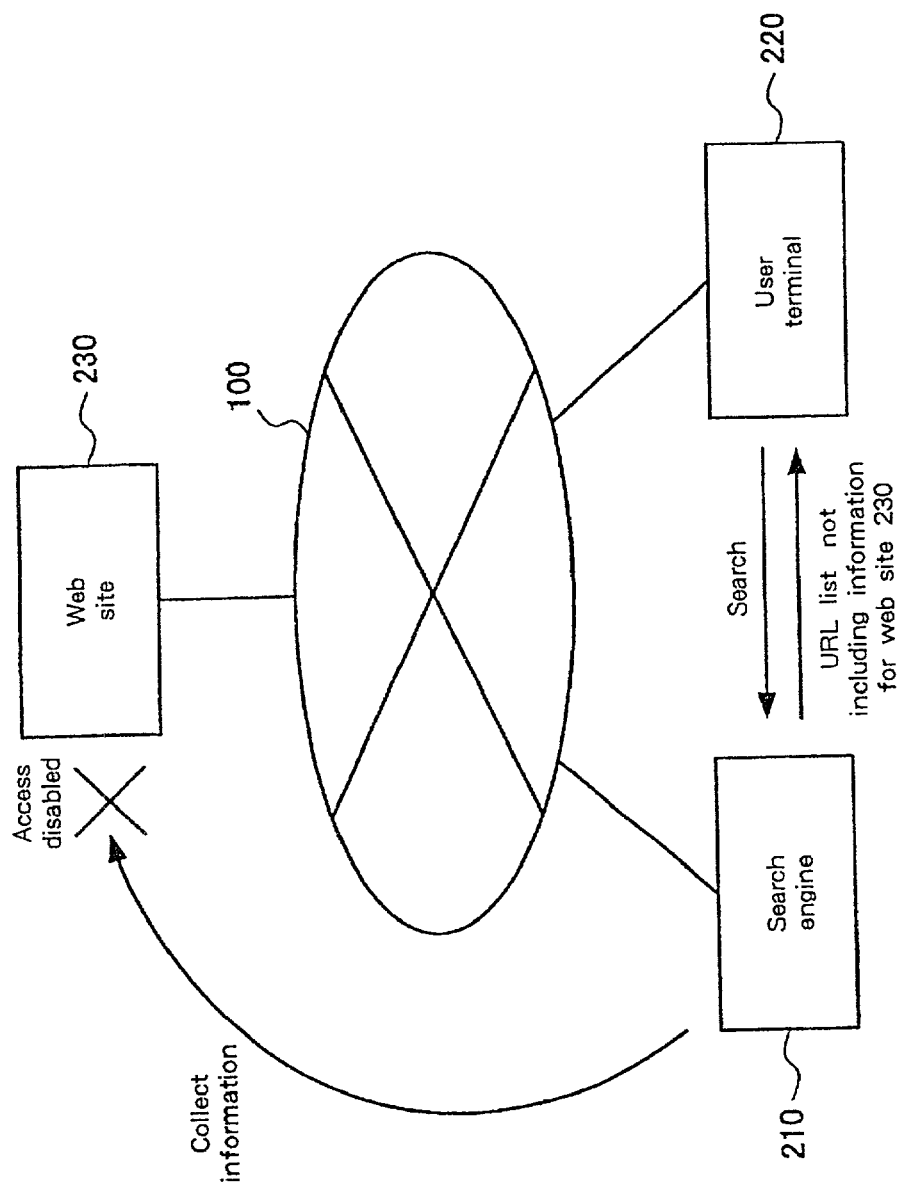

WEB SITE, INFORMATION COMMUNICATION TERMINAL, ROBOT SEARCH ENGINE RESPONSE SYSTEM, ROBOT SEARCH ENGINE REGISTRATION METHOD, AND STORAGE MEDIUM AND PROGRAM TRANSMISSION APPARATUS THEREFOR

BACKGROUND OF THE INVENTION

1. Field of the Invention

The present invention relates to a system according to which an information site, provided on a communication network, issues different responses in accordance with the types of the sources of access request transmissions.

2. Discussion of Related Art

Presently, there are many sites on the Internet whereat information on a variety of subjects is available; but not all these sites can be freely accessed, some of them have established membership requirements and limit access to members only, while others grant access only to those users who are willing to pay a browsing fee.

On the Internet to search sites and to efficiently locate and assemble desired information, most users rely on the use of search engines.

FIG. 17 is a diagram of an information search for which a search engine is being employed.

As is shown in FIG. 17, a search engine 210 collects information scattered across the Internet and assembles it to form a URL list, or it initiates a search upon the receipt of a search request from a user terminal 220, to which it transmits the results of the search. For a search, various search methods are used, such as one where a keyword is used or one that is based on parsing performed in accordance with categories.

Further, methods for obtaining information using search engines include one whereby information is registered on a list in accordance with a request from a site, and one that uses a robot search engine to mechanically visit sites and obtain information.

A robot search engine will now be described.

In a robot search engine, software called a robot, a crawler or a spider (hereinafter referred to simply as a robot) uses HTTP to collect search targets, HTML documents, from web servers, and provides a full document, keyword based search service for the collected results. The activities of a typical robot will now be specifically described.

1. Selects one uncollected URL from a URL listing of HTML documents.
2. Transmits an HTTP request to a WWW server in order to obtain an HTML document from the selected URL.
3. Generates for the HTML document, once it has been obtained, an index and an abstract, and either stores them in a storage device, or abandons them.
4. Detects the URL of the HTML document, once it has been obtained, using a hyperlink in the HTML document.
5. Adds the detected URL to the URL list in 1.
6. Returns to 1 if an URL in the URL list has not yet been collected.

This processing is used to control the robot and move it from URL to URL.

Since robot search engines usually do not have the right of access for the sites at which only limited access is permitted, the engines can not enter such sites to retrieve information. Therefore, even when the information required by a user is available at a specific site, so long as only limited access to the site is permitted, attempts by the robot search engine to retrieve information from the site will be rebuffed, and the user in question will not be able to find the site using the robot search engine. This state is shown in FIG. 18.

From the viewpoint of the site, since its URL is not acquired and added to a list of available sites by the robot search engine, the information it can provide will not be fully advertised.

As one method for advertising a site to an audience of unspecified users, the site may be registered on a URL list by a robot search engine and may then be registered with a search engine for the creation, using manpower, of a category list and a home page to be employed as an advertisement, or a banner advertisement may be prepared.

As is described above, when a site on the Internet permits only limited access, a robot search engine that does not have the right of access can not retrieve any information from the site. Thus, the information can not be added to a URL list maintained by the robot search engine, and a user who requires that information will not be able to depend on the robot search engine to search for and acquire the information he or she requires. Therefore, since a site for which only limited access is permitted will not be registered in the URL list of the robot search engine, the existence of the information at the site will not be advertised.

Further, as is described above, in addition to the registration of a site in the URL list of a robot search engine, a method is available whereby human labor is utilized to prepare a URL list and to register a site with a search engine, and another method is available for the setting up of an advertisement home page or the creation of a banner advertisement.

However, robot search engines are widely employed for searching for desired information on the Internet, and using them to register information on URL lists is a very effective advertising means.

Furthermore, for the two advertising methods described above, labor is required to register sites on search engines and to set up homepages and create banner advertisements. And in addition, each time the information available at a site is to be updated, the site issues a notification to that effect and manual labor must be is employed for the updating. But since a robot search engine can automatically access a site and obtain information, the requirement for labor to perform these activities can be eliminated.

Therefore, even though a robot search engine can not acquire information at a site whereat access is limited, metadata (a keyword concerning information) can be provided for the information the robot search engine seeks, and the advertising effects available with the robot search engine can be provided.

Further, if a user, who like a robot search engine does not possess the right of access for a site whereat only limited access is permitted, transmits via a browser an access request to the site, and metadata, such as a message used to describe the information, is provided, even though actual access was not permitted, a beneficial advertisement effect can be expected.

It is, therefore, one object of the present invention to provide metadata, for information that is available at a site whereat only limited access is permitted, upon the receipt by the site of an access request from a robot search engine.

It is another object of the present invention to enable the selective provision of appropriate information, by a site whereat only limited access is permitted, consonant with the access rights of the source of a request for information.

SUMMARY OF THE INVENTION

To achieve the above objects, according to the present invention, a web site provided in a communication network comprises: a data manager, for storing information to be provided across the communication network; a transmission source determiner, for ascertaining the type of a transmission source from which an access request is received; and a response unit, for acquiring, from the data manager, information that is correlated with the type of the transmission source obtained in accordance with the determination made by the transmission source determiner, and for generating and returning a response that is consonant with the type of the transmission source of the access request, wherein the data manager stores main information, for which access is limited, and metadata, which is information describing the main information, and wherein, as the result of the determination by the transmission source determiner, when the transmission source of the access request has no right of access for the main information, the response unit obtains metadata that is then used to generate a response.

With this configuration, the metadata concerning the main information can be provided the robot in a robot search engine or a user who possesses no access rights.

When the transmission source of the access request identified by the transmission source determiner is a robot in a robot search engine that is launched across the communication network, the response unit generates a response, as metadata, that includes a keyword concerning the main information.

This configuration is preferable because the keyword necessary to prepare a keyword index in the search engine can also be obtained for main information for which access is limited.

The transmission source determiner includes a user agent register in which the robot, of the robot search engine, which is launched across the communication network, and a user agent header that the robot adds to the access request are registered as correlating with each other. When the contents of the user agent header added to the access request that is received are registered in the user agent register, the transmission source determiner determines the transmission source of the access request to be the robot of the robot search engine.

This configuration is preferable because metadata consisting of a keyword can be provided for the robot of a famous search engine.

The transmission source determiner includes a user register in which each access right of a user for the main information is registered. When a user ID, provided as cookie information, together with the access request that is received, is registered in the user register, the transmission source determiner notifies the response unit of the range of the access rights of the user that is indicated in the user register. In accordance with the range of the access rights of the user, which is received from the transmission source determiner, the response unit generates a response, as metadata, that includes text data for describing the contents of the main information that is requested by the access request.

This configuration is preferable because a description of the contents of the main information can be provided a user who does not have access rights.

According to the present invention, a web site established in a communication network comprises: a data manager, for storing subscription information to be provided across the communication network; a transmission source determiner, for determining whether a user who is the transmission source of an access request has paid a fee for the subscription information; and a response unit, for transmitting, in accordance with the determination made by the transmission source determiner, the subscription information to a user who has paid the fee for the subscription information, and instead of the subscription information, transmitting at no cost a description of the subscription information to a user who has not paid the fee.

This configuration is preferable because a description of the contents of the subscription information can be provided at no cost to the user who has not paid the fee for the subscription information.

According to the present invention, an information communication terminal is provided for accessing an information site on a communication network, and for obtaining information available at the information site, whereto a request, together with identification information for the information communication terminal, is transmitted to acquire the information; and whereat, when the information that is requested falls in an access right range that, for the information communication terminal, is set in accordance with the identification information, the information is provided by the information site, and when the information that is requested does not fall in the access right range, metadata, which is information describing the information available at the information site, is provided.

According to the present invention, the following robot search engine response system can be provided. Specifically, the robot search engine response system comprises: a transmission source determiner, for analyzing an access request received by a web server provided on a communication network, and for identifying the transmission source of the access request; and a response unit, for transmitting, when the transmission source of the access request identified by the transmission source determiner is a robot of a robot search engine, a keyword concerning the web page source to the robot instead of a web page source requested by the access request.

According to the present invention, the following robot search engine registration method can be provided for a web site provided along a communication network. Specifically, a robot search engine registration method comprises the steps of: mechanically accessing a web site via a communication network and obtaining a web page source stored at the web site; accepting an access request from a robot of a robot search engine that prepares a web page search list; and transmitting to the robot, instead of a web page source requested by the access request, a keyword concerning the web page source.

According to the present invention, a storage medium is provided on which input means of a computer stores a computer-readable program that permits the computer to perform: a process for analyzing an access request received by a web server that is provided on a communication network and for determining a transmission source of the access request; and a process for, when the transmission source of the access request is a robot of a robot search engine, transmitting a keyword concerning a web page source to the robot instead of the web page source contained in the access request.

With this configuration, the computer that installs the program can transmit a keyword string, instead of the web page source, in accordance with the access request issued by the robot of the robot search engine.

According to the present invention, a program transmission apparatus comprises: storage means for storing a program; and transmission means for reading the program from the storage means and transmitting it.

BRIEF DESCRIPTION OF THE DRAWINGS

FIG. 3 is a diagram showing an example User-Agent header for an HTTP request used for the embodiment.

FIG. 5 is a diagram showing example metadata for educational material and material elements that constitute the main information prepared in accordance with the embodiment.

FIG. 6 is a diagram showing an example HTTP request.

FIG. 7 is a diagram showing an example user agent register according to the embodiment.

FIG. 8 is a diagram showing an example user register according to the embodiment.

FIG. 9 is a diagram showing an example HTTP response to be transmitted to the robot of a search engine.

FIG. 10 is a diagram showing an example URL list prepared by the search engine.

FIG. 11 is a diagram showing search results obtained when a search for information is performed using a search engine.

FIG. 12 is a diagram showing an example HTTP response to be transmitted to a non-registered user according to the embodiment.

FIG. 13 is a diagram showing an example HTTP response prepared in order to issue cookie information.

FIG. 14 is a diagram showing the state obtained by updating a user register in FIG. 8 using guest user registration.

FIG. 15 is a diagram showing an example HTTP response to be transmitted to a guest user according to the embodiment.

FIG. 16 is a diagram showing the state obtained by updating the user register in FIG. 14 by employing user registration.

FIG. 18 is a diagram showing the state wherein a search for information for which access is limited can not be performed by a search engine.

DETAILED DESCRIPTION OF PREFERRED EMBODIMENTS

The preferred embodiment of the present invention will now be described in detail while referring to the accompanying drawings.

Figure 1:
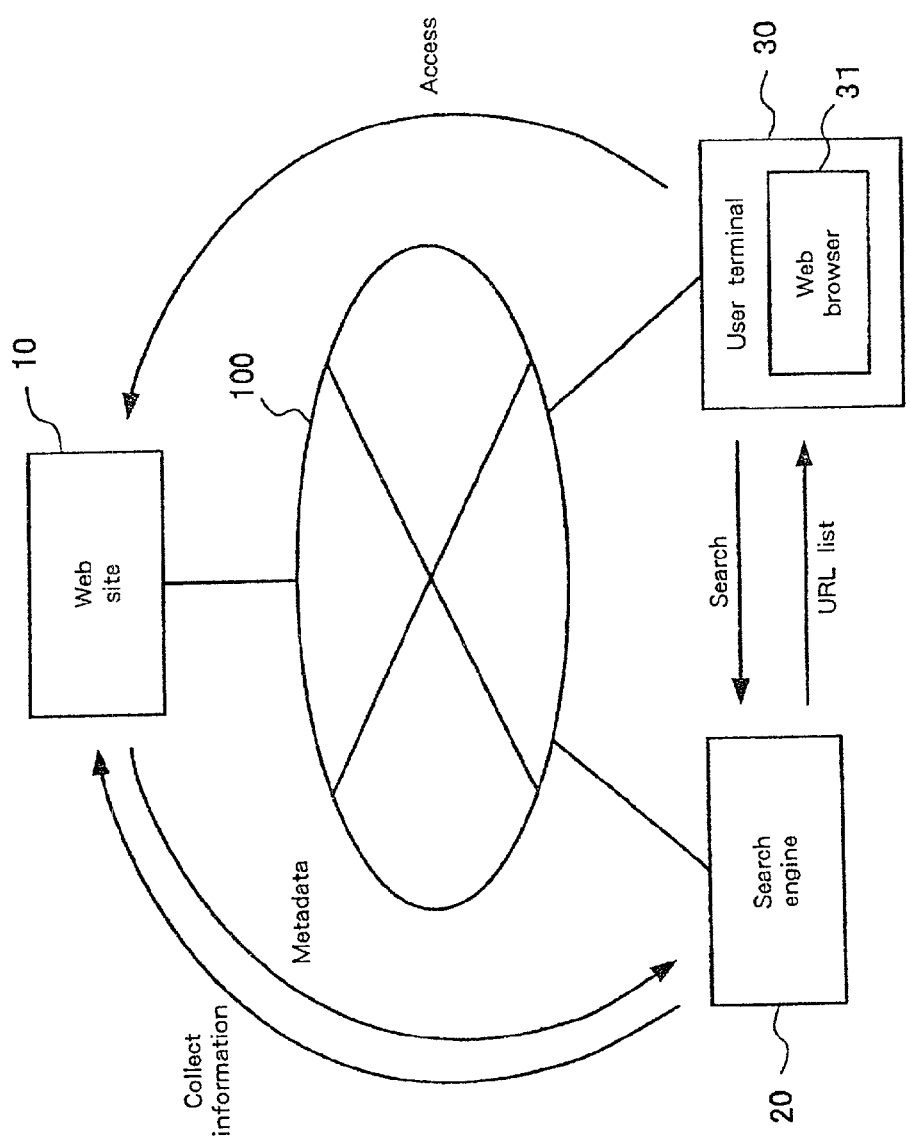
FIG. 1 is a diagram showing an example configuration according to one embodiment for a network environment wherein web sites are interconnected.

FIG. 1 is a diagram showing the configuration of a network environment wherein a web site is connected in accordance with the embodiment.

In FIG. 1, a web site 10 provides an information provision service in accordance with the embodiment. An ordinary robot search engine 20 mechanically accesses the web site 10, obtains information such as a keyword and registers it in a URL list. A user terminal 30 employs an incorporated web browser 31 to access the web site 10 via a communication network 100, or to access the search engine 20 and search for a web page that includes desired information. The communication network 100 is a network system based on the Internet, such as the WWW (World Wide Web) or an intranet, across which information is exchanged.

In FIG. 1, only the web site 10 and the robot search engine 20 that implement the embodiment are shown.

Actually, other general web sites and search engines, which register the URLs of web sites on URL lists, using manpower, in accordance with requests from the sites, are connected to the communication network 100. For the user terminals 30, access right relative to the web site 10 differ depending on the user. As will be described later, the web site 10 copes with the each user terminal 30 in accordance with its access rights. The functions of the user terminal 30 are carried out by various types of information communication terminals, including workstations, personal computers, other computer systems and PDAs (Personal Digital Assistants). The access rights for the web site 10 depend not on the apparatus constituting the user terminal 30 and the type of the web browser 31, but on the user of the user terminal 30.

Figure 2:
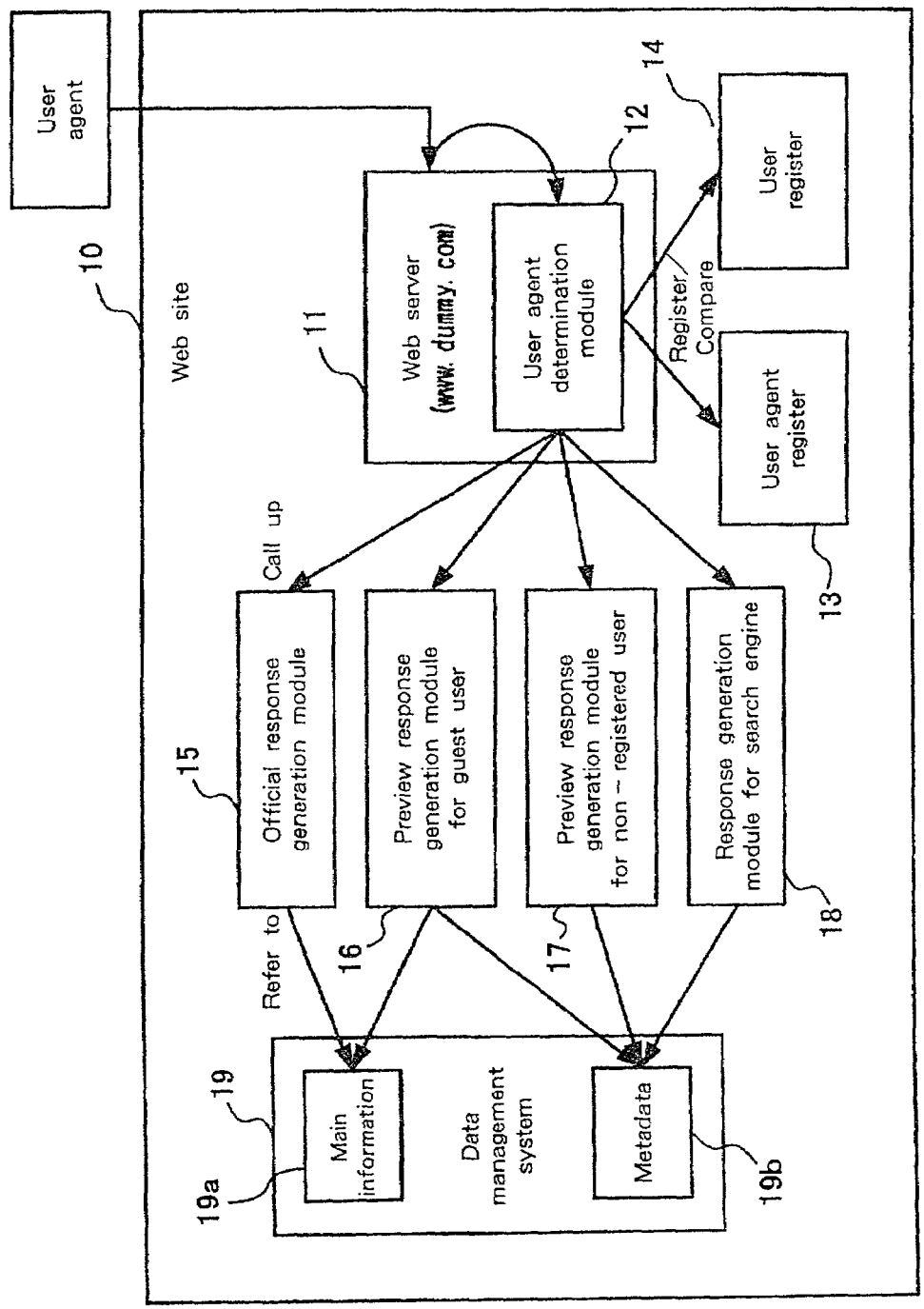
FIG. 2 is a diagram for explaining the configuration of a web site according to the embodiment.

FIG. 2 is a diagram for explaining the configuration for this embodiment of the web site 10.

In FIG. 2, the web site 10 comprises: a web server 11, for providing a service via the communication network 100; a user agent determination module 12, for determining the sender of an access request received by the web server 11; a user agent register 13; a user register 14; an official response generation module 15, for generating a response in accordance with the type of the sender of the access request; a preview response generation module for a guest user 16; a preview response generation module for a non-registered user 17; a response generation module for a search engine 18; and a data management system 19, for storing information provided by the web site 10.

With this arrangement, the web server 11 provides a file or data upon receipt of an HTTP request (access request) from the user terminal 30 or the search engine 20. The web server 11 can be constructed using ordinary server hardware.

The user agent determination module 12 is mounted on the web server 11 using a CGI (Common Gateway Interface) or a Java servlet, and determines the transmission source of the HTTP request that is received by the web server 11. For this determination, a method for referring to the User-Agent header of the HTTP request is employed.

Generally, the header information called the User-Agent header is added to the HTTP request, and in the header information a character string is set as a self-statement employed by a user agent to identify himself or herself. For example, in the case of the Netscape Navigator of Netscape Communications, the User-Agent header shown in FIG. 3 is added. In this header, a value "Mozilla/4.7[ja] (Win98, I)" is placed on the third row, and indicates that "Netscape browser version 4.7, Japanese edition, was operated on the Microsoft OS, Windows 98".

Similarly, for the HTTP request issued by the robot in the robot search engine 20, so long as the web site 10 knows the contents of the User-Agent header added by the robot, all the web site 10 must do to determine the identity of the transmission source of the HTTP request is examine the User-Agent header of the HTTP request. Generally, since the contents of the User-Agent headers of the robots of popular, frequently used search engines are known, it is possible, by referring to the User-Agent header, for the transmission source of an HTTP request to be identified as the robot of a predetermined search engine. Further, when the contents of a User-Agent header are not known to the web site 10 or when the HTTP request does not include a User-Agent header, the user agent may be a "malicious" user agent that issues many requests in a short period of time, and imposes an excessive load on the web server 11, and the request may be simply rejected.

Further, when the HTTP request is issued by the web browser 31 of the user terminal 30, the user agent determination module 12 can employ the user ID that is received with the HTTP request as cookie information for a more accurate parsing of the transmission source of the HTTP request. When the parsing of the transmission source of the HTTP request is performed in detail, it is possible to return different information, depending on the source, and to deal with the HTTP request closely. To what degree the transmission source of the HTTP request is to be parsed can be arbitrarily determined, and depends on the management policy of the web site 10 and the type and the contents of the information to be provided. For example, the user ID may not be employed for determination, and only the robot of the search engine 20 may be identified and dealt with differently. It should be noted that the method whereby the user ID for the cookie information is employed to identify the access rights of the user is merely an example, and the access rights may be examined after the user enters the registration number or completes the registration, or pays the fee.

In the following explanation, which will now be given for this embodiment, it is assumed that an official user who possesses full access rights for the information stored in the data management system 19 of the web site 10, a guest user who possesses partial access rights, a non-registered user who has no access rights, and the robot of the search engine 20 are distinguished from each other.

The User-Agent header is registered and held in the user agent register 13. Then, when the web server 11 receives an HTTP request, the user agent determination module 12 examines the user agent register 13 to find the User-Agent header to be added to the HTTP request. If the User-Agent header has been registered in the user agent register 13, the transmission source of the HTTP request is determined to be the robot of the search engine 20.

The search engines 20 can be differentiated by ranking User-Agent headers and registering them in the user agent register 13 in accordance with the ranks to which they are assigned. Thus, for example, for the robot (A) of a search engine 20 having a high rank, information may be returned for each access, while for the robot (B) of a search engine 20 having a low rank, access requests may be rejected, information may be returned only once every several accesses, or only a small amount of information may be returned. For ranking, an arbitrary ranking reference may be employed, such as the number of users of a search engine 20 or whether a search engine 20 is an integral part of a web site 10.

A user ID transmitted as cookie information is registered and held in the user register 14 in accordance with the access rights that are possessed by each user. Then, when the web server 11 receives an HTTP request, the user agent determination module 12 examines the user register 14 to find the user ID that as cookie information was received with the HTTP request. Whether or not the user ID has been registered in the user register 14 is determined, and when it has been registered, the contents of the access rights possessed by the user are examined. It should be noted that the user register 14 is not a requisite component. When all that is required is a determination as to whether the transmission source of the HTTP request is a robot of the search engine 20, only the user agent register 13 need be referred to, and the user register 14 need not be prepared.

The official response generation module 15 obtains from the data management system 19 all the information, including the information to be accessed, that is requested in the HTTP request, and generates a reply for the transmission source of the HTTP request.

The preview response generation module for a guest user 16 obtains only that information which is mentioned in the HTTP request and is stored in the data management system 19, and for which the access rights are possessed by a guest user. Further, the preview response generation module for a guest user 16 also obtains for the guest user metadata describing the official content of the obtained information, and generates a response to the transmission source of the HTTP request.

The preview response generation module for a non-registered user 17 obtains, from the data management system 19, the metadata for a non-registered user who does not possess access rights, and generates a response to the transmission source of the HTTP request.

The response generation module for a search engine 18 obtains, from the data management system 19, the metadata for the robot of the search engine 20, and generates a response to the robot that is the transmission source of the HTTP request.

The contents of the information obtained by the response generation modules 15 and 18 and the responses generated thereby will be described later. In this embodiment, four kinds of response generation modules are provided in accordance with the kinds of HTTP request transmission sources, but the generation modules are not limited to these four. Especially for modules other than the official response generation module 15, more generation modules may be provided in accordance with the range of the access rights that is accurately set, or conversely, only a single response module may be employed to deal with an HTTP request transmission source that does not have access rights.

The data management system 19 stores information (including digital content and a service) for a service to be provided by the web site 10. The information stored in the data management system 19 is main information 19*a* to be provided by the web site 10 and metadata 19*b* describing the main information 19*a*.

The main information 19*a* includes information for which access is limited and information for which access is not limited. Only a user who possesses access rights can acquire or read the information for which access is limited, while all users can acquire or read the information for which access is not limited. The access rights can be set in various ways, such as for an official user who is permitted to access all information for which access is limited, or a guest user who is permitted to access information with the provision that only a part of the information will be made available, or that the quality of the content will be reduced.

The metadata 19*b* is provided instead of the main information 19*a* for a user who does not possess the access rights required for the main information 19*a* for which access is limited. The metadata 19*b* includes an explanation of the contents of the main information 19*a*, a keyword concerning the main information 19*a* or a message explaining how to request the access rights required to acquire or to read the main information 19*a*, and is mainly text.

The main information 19*a* and the metadata 19*b* will now be described by using specific examples.

Assume that the main information 19*a* is educational material for studying the theory of relativity in physics, and includes an explanatory statement, static image data, moving image data and voice data, and that only an official user is permitted to access the three kinds of data other than the static image data, and that both an official user and a quest user are permitted to access the static image data.

In this case, the metadata 19b includes: a statement that the educational material package has been prepared for the study of the theory of relativity and that it includes an explanatory statement, static images, moving images and voices; keywords concerning the theory of relativity, such as "Einstein", "velocity", "light" and "gravity"; a method (a registration method or a fee payment method) by which access rights to read these data contents may be obtained; and a link to a page for accepting the conditions establishes to obtain access rights.

Further, the metadata 19b can include a message for a guest user indicating that the only information provided a guest user is static image data, an official user registration method and a link to a registration page.

In addition, if permission is granted for lower quality static image data to be provided a non-registered user, the metadata 19b may include a message stating that image data having a higher quality can be provided for a guest user or an official user.

Figure 4:
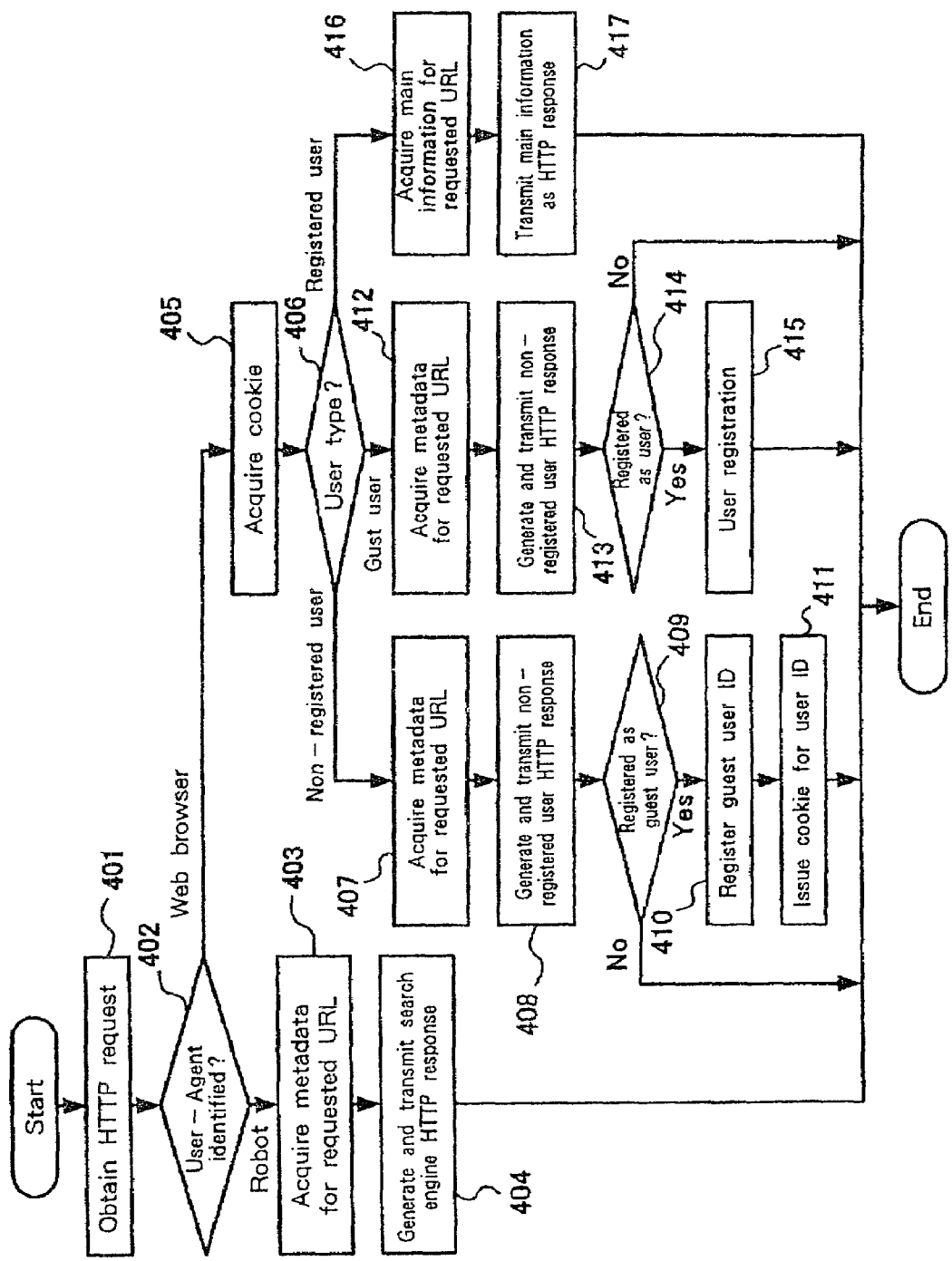
FIG. 4 is a flowchart for explaining the processing performed for the embodiment.
Figure 17:
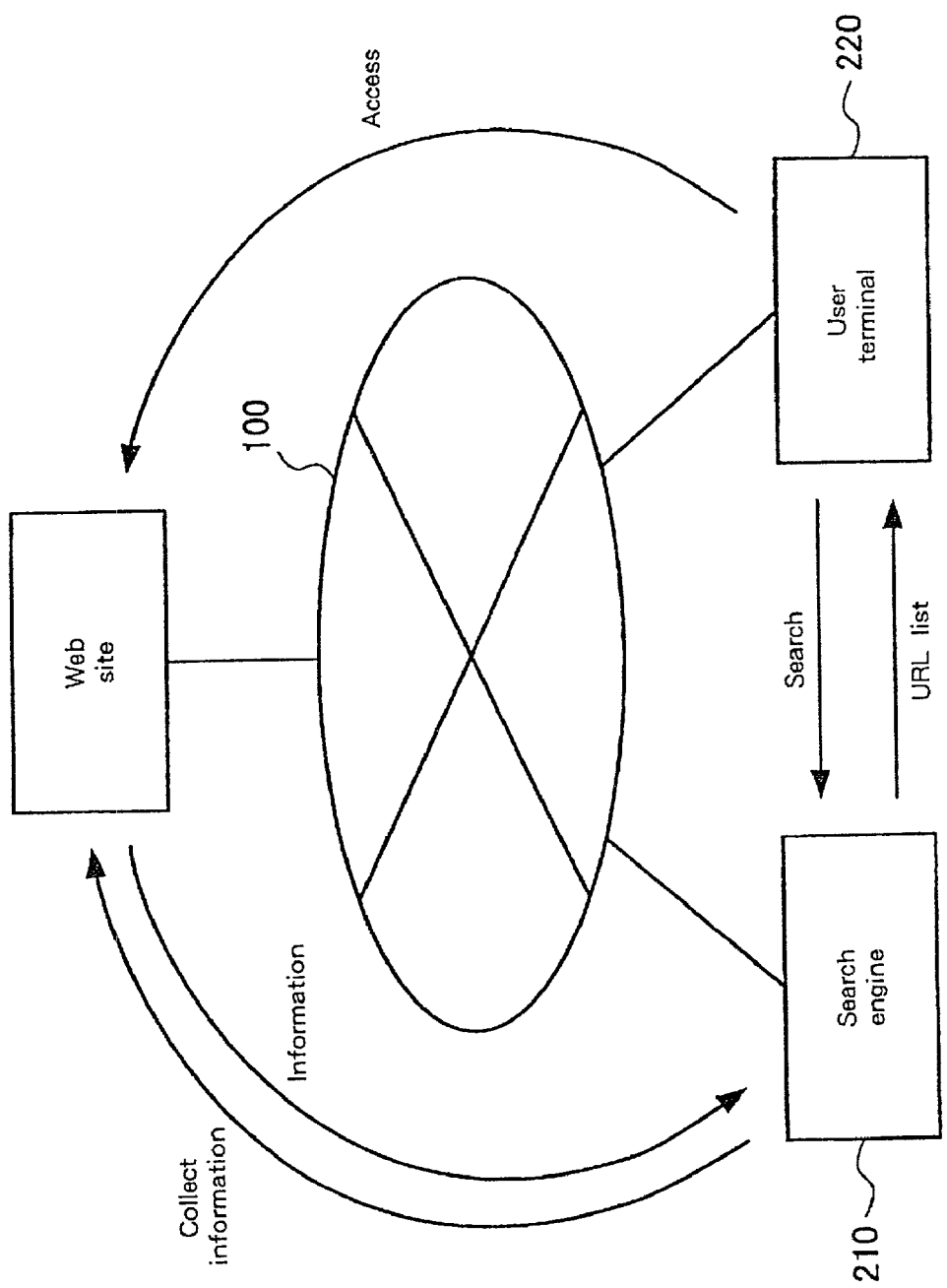
FIG. 17 is a diagram showing the state of an information search using a search engine.

FIG. 4 is a flowchart for explaining the processing for the embodiment.

In FIG. 4, when the web server 11 of the web site 10 receives an HTTP request (step 401), the user agent determination module 12 determines the type of user agent that represents the transmission source of the HTTP request (step 402). When the User-Agent header is examined by referring to the user agent register 13 and the user agent of the HTTP request is identified and is the robot of the search engine 20, program control is shifted to the response generation module for a search engine 18.

First the response generation module for a search engine 18 extracts from the data management system 19 the metadata 19b describing the information at the URL for which the HTTP request was submitted (step 403). In this case, since the metadata 19b is to be released to the robot of the search engine 20, the keywords constitute the main contents of the metadata 19b.

Then, the response generation module for a search engine 18 employs the metadata 19b to generate a response and transmits it via the web server 11 to the robot of the search engine 20, which is the transmission source of the HTTP request (step 404). Specifically, the response is an HTML document in which the keywords obtained at step 403 are enumerated.

When it is ascertained at step 402 that the user agent of the HTTP request is not the robot of the search engine 20, the user agent determination module 12 obtains the cookie information from the transmission source of the HTTP request (step 405), and employs the user ID in the cookie information to determine the type of user (the presence/absence of the access rights and their range) (step 406). This means that all the HTTP requests having a User-Agent header that has not yet been registered in the user agent register 13 are treated as though they were transmitted by the web browser 31 of the user terminal 30. The transmission source of the HTTP request could be a robot of the search engine 20 that has not been registered in the user agent register 13. However, even in this case, the robot of the search engine 20 will be regarded as a non-registered user, and at the least, a response including information such as the keywords is returned to the search engine 20, so that no particular inconvenience occurs.

When a user whose identification is based on cookie information has not yet registered in the user register 14, and when the cookie information has not been set, this user is identified as a non-registered user, i.e., a user who does not possess access rights to the main information 19a that is stored in the data management system 19 and for which access is limited. Thus, program control is shifted to the preview response generation module for a non-registered user 17.

First, the preview response generation module for a non-registered user 17 extracts from the data management system 19 the metadata 19b describing the information at the URL for which the HTTP request was submitted (step 407). In this case, since the metadata 19b is to be released to the non-registered user, the metadata 19b includes the keywords, the explanatory statement for the main information 19a, and the method to be used to obtain the access rights (the registration method).

Next, the preview response generation module for a non-registered user 17 employs the metadata 19b to generate a response, and transmits it via the web server 11 to the user terminal 30 of the non-registered user, the transmission source of the HTTP request (step 408). Specifically, the response is an HTML document including the explanatory statement and the keywords obtained at step 407, and a link to a page whereat a guest user registration will be accepted.

Assume that the non-registered user who issued the HTTP request shifts to the page whereat, in accordance with the response from the web site 10, an application for a guest user registration will be accepted, and applies for registration as a guest user (step 409). This registration application is transmitted as an HTTP request to the preview response generation module for a non-registered user 17, and the preview response generation module for a non-registered user 17, registers, in the user register 14, the user ID of the non-registered user as a guest user (step 410) and transmits an HTTP response to the user terminal 30 of the pertinent user in order to issue cookie information, which includes the user ID (step 411).

If, at step 406, the user ID of the cookie information obtained from the HTTP request has been registered as a guest user in the user register 14, it is ascertained that the transmission source of the HTTP request is a guest user, and program control shifts to the preview response generation module for a guest user 16.

First, the preview response generation module for a guest user 16 extracts, from the data management system 19, the metadata 19b describing the information at the URL that for which the HTTP request was submitted (step 412). In this case, since the metadata 19b is to be released to the guest user, the metadata 19b includes the keywords, an explanatory statement concerning the main information 19a, and method to be used to register as an official user. Following this, the preview response generation module for a guest user 16 employs the metadata 19b to generate a response, and transmits it via the web server 11 to the user terminal 30 of the guest user, the transmission source of the HTTP request (step 413). Specifically, the response is an HTML document which includes the explanatory statement and the keywords acquired at step 407, and a link to the page whereat a registration application for an official user is accepted (user registration).

Assume that the guest user who issued the HTTP request shifts to the page whereat, in accordance with the response from the web site 10, a user registration will be accepted, and applies for registration (step 414). This registration application is transmitted as an HTTP request to the preview response generation module for a guest user 16, and the preview response generation module for a guest user 16 registers in the user register 14, as an official user, the user ID of the guest user (step 415). Thereafter, the pertinent user is treated as an official user who possesses access rights for all the main information 19a.

When, at step 406, the user ID of the cookie information obtained from the HTTP request has been registered in the user register 14 as an official user, it is ascertained that the transmission source of the HTTP request is an official user, and program control is thereafter shifted to the official response generation module 15. The official response generation module 15 then obtains, from the data management system 19, the information at the URL for which the HTTP request was submitted (step 416), and transmits the information via the web server 11 to the user terminal 30 of the user that is the transmission source of the HTTP request (step 417).

In this manner, a response is generated in accordance with the transmission source of the HTTP request and the range of the access rights, and is transmitted to the transmission source. Therefore, a user who possesses the access rights for the main information 19a can obtain all the requested main information 19a, and a user who does not have the access right obtains the metadata 19b describing the requested main information 19a. A user who has a partial access right for the main information 19a obtains both the main information 19a within the range permitted for those access rights, and the metadata 19b describing the portion of the main information 19a for which the user does not hold possess the access rights. Since the information describing the main information 19a for which the user does not have access rights can be obtained as the metadata 19b, and the user can receive an index to use to determine whether he or she should acquire further access rights.

The robot of the search engine 20 can obtain the metadata 19b consisting of keywords for the main information 19a for which access is limited. Therefore, for a user who employs the search engine 20 the web site 10 can provide the information describing the main information 19a or can use it as an advertisement for the main information 19a.

A specific example for the embodiment will now be described. In this embodiment, a subscription service for providing, across the Internet, educational material for distance education for registered users is employed as an example.

At a web site 10, www.dummy.com, of the provider of this service, HTML documents for education material, which is a web page source, are provided via a web server 11. The education material includes links to the material elements of images, movies and narrations. That is, the education material and the element materials form the main information 19a. An educational material file and material element files are so arranged that a web browser 31 of a user terminal 30 can refer to them by using the following URLs.
Educational material: http://www.dummy.com/edu.html
Images: http://www.dummy.com/image.gif
Movies: http://www.dummy.com/movie.mov
Narrations: http://www.dummy.com/narration.au Metadata 19b, wherein an overview, keywords, a category name and an importance level are written as text are prepared for the educational materials and the material elements. The definition of the importance level will be described later.

FIG. 5 is a diagram showing the metadata 19b for the educational material and the material elements.

Assume that the user agent that accesses the education material is a robot of a search engine 20 or the web browser 31 of the user terminal 30 of the user. When the transmission source of the HTTP request is the robot of the search engine 20, the robot cyclically visits the site www.dummy.com, obtains the URL of the educational material edu.html, and employs an HTTP response to prepare a keyword index for a search. Generally, the keyword extraction means differs at the site of the search engine. While this embodiment does not depend on this means, typical keyword extraction means used by a robot are well known in most cases. Therefore, it is preferable that an HTTP response be so prepared that a keyword can be easily extracted by the robot. For example, a keyword may be inserted in a title tag, or in the first paragraph.

When the transmission source of the HTTP request is the web browser 31 of the user terminal 30, the presence/absence of access rights and the range of the access rights are examined and a corresponding process is performed, depending on whether it is for a non-registered user, a guest user or a registered user. User IDs and passwords of users are registered in the user register 14 of the web site 10. A guest user is a user who employs a user ID that is so prepared that an overview of the educational material and part of its contents are provided as a sample to solicit user registration.

Under the above condition, when the web server 11 of the web site 10 receives an HTTP request for the acquisition of the education material, the web server 11 transmits the HTTP request to the user agent determination module 12.

The user agent determination module 12 refers to the user agent register 13 and the user register 14, and identifies the requested URL and the user type. Assume that an HTTP request shown in FIG. 6 is received via the web server 11 and refers to the education material edu.html. In order to identify the user type, the user agent identification information (<User#Agent>) written in the User-Agent header field on the second row and the cookie information (userid=<User#ID>) written in the Cookie head field on the fifth row are employed.

First, the user agent register 13 is examined in order to distinguish the robot of the search engine 20 from the web browser 31 of the user terminal 30. FIG. 7 is a diagram showing an example user agent register 13 in this case. The client identification information <User#Agent> written adjacent to the User-Agent tag in the HTTP request in FIG. 6 is compared with the user agent register 13 to determine whether the transmission source of the HTTP request is the robot of the search engine 20 or the web browser 31 of the user terminal 30. As is described above, since the user agent of the search engine 20 or the web browser 31 are frequently employed and are usually well known, the transmission sources of almost all the HTTP requests can be identified as either the robot or the web browser 31 by examining the user agent register 13.

When the transmission source of the HTTP request is the web browser 31 of the user terminal 30, the user register 14 is employed to identify the user type based on the access rights. FIG. 8 is diagram showing an example user register 14. The user ID <User#ID>, which is written as cookie information adjacent to the User#ID tag in the HTTP request in FIG. 6, is compared with the user register 14, and the user type is identified. Thus, when the cookie information is not included in the HTTP request, the user can be identified as a non-registered user; when the cookie information, i.e., the user ID, is included in the HTTP request and is registered as a guest user in the user register 14, the user can be identified as a guest user; and when the user ID is registered as a registered user, the user can be identified as a registered user.

The user agent determination module 12 calls up a response generation module in accordance with the type of the transmission source of the HTTP request, or the user type of the transmission source. That is, the response generation module for a search engine 18 is called up when the transmission source is the robot of the search engine 20; the preview response generation module for a non-registered user 17 is called up when the transmission source is the web browser 31 and is used by a non-registered user; the preview response generation module for a guest user 16 is called up when the transmission source is the web browser 31 and is used by a guest user; and the official response generation module 15 is called up when the transmission source is the web browser 31 and is used by a registered user.

Hereinafter, these individual cases are described.

1) When the transmission source of the HTTP request is the robot of the search engine 20:

When the transmission source of the HTTP request is the robot of the search engine 20, the user agent determination module 12 transmits the requested URL to the response generation module for a search engine 18. The response generation module for a search engine 18 searches for the metadata 19b that correspond to the material elements included in the document at the URL, and generates an HTTP response that includes only the keywords and the category name. The HTTP response is then transmitted, via the web server 11, to the robot of the search engine 20 that is the transmission source of the HTTP request.

An example, HTTP response for this case is shown in FIG. 9.

At the site of the search engine 20, the robot of the search engine 20 extracts the keywords from the text adjacent to the <body> tag in the HTTP request, prepares a keyword index and creates the URL list.

An example URL list in this case wherein the URLs and corresponding keywords are entered is shown in FIG. 10.

The search engine 20 receives a keyword that is entered by a user who employs the search engine 20 to search for desired information, and examines the keyword index to find the URL that includes the pertinent keyword. As the search result, an example HTTP response shown in FIG.11, which includes as a link the obtained URL, is prepared and is transmitted to the web browser 31 of the user.

2) When the transmission source of the HTTP request is the web browser 31 of the user terminal 30:

When the transmission source of the HTTP request is the web browser 31, the user agent determination module 12 obtains the cookie information from the transmission source, and examines the user register 14 to determine the type of the user that issued the HTTP request. When the cookie information is not set, or when the user is not found in the user register 14, the pertinent user is identified as non-registered.

2-1) When the transmission source of the HTTP request is a non-registered user:

When the user is identified as non-registered, the user agent determination module 12 transmits, to the preview response generation module for a non-registered user 17, the URL of requested educational material and an instruction for the generation of a response for the non-registered user. The preview response generation module for a non-registered user 17 then searches for the metadata 19b that corresponds to the element materials that are referred to at the designated URL, and generates an HTTP response that presents as a sample an overview of the educational material and part of its contents, and that includes an advertisement for soliciting user registration. The HTTP response is then transmitted to the web browser 31 of the user terminal 30, which is the transmission source of the HTTP request.

An example HTTP response in this case is shown in FIG. 12.

In the HTTP response in FIG. 12, ad.html included in the tag on the ninth row is the URL of a document that includes the sample of the educational material and an advertisement for soliciting user registration, and includes a form for issuing to a non-registered user the account of a guest user. When the user clicks on the hyperlink that is displayed by the web browser 31 using the tag on the ninth row, the display is shifted to the page ad.html, so that the user can submit the guest user application. This application is then transmitted as an HTTP request to the preview response generation module for a non-registered user 17. Thereafter, the preview response generation module for a non-registered user 17 registers a new user ID (hereinafter referred to as "anderson") in the user register 14, and transmits an HTTP response to the web browser 31 in order to issue cookie information that includes this user ID.

An example HTTP response for issuing the cookie information is shown in FIG. 13. Upon the receipt of the HTTP response, the web browser 31 stores, as its own user ID, the value userid=anderson in the Set-Cookie header field on the fourth row.

Since the registration of the guest user has been completed, the user register 14 in FIG. 8 is updated as is shown in FIG. 14.

2-2) When the transmission source of the HTTP request is a guest user:

When the user who is now registered as guest user "anderson" issues an HTTP request to access the URL for educational material, the cookie information is included in the HTTP request, and the user agent determination module 12 examines the cookie information to obtain the client identification information for the transmission source. When as a result of an examination of the user register 14 "anderson" is identified as a guest user, the user agent determination module 12 transmits, to the review response generation module for a guest user 16, the URL of the requested education material and an instruction for the generation of a response to the guest user. The preview response generation module for a guest user 16 then searches for the metadata 19b that correspond to the individual material elements at the URL that are referred to, and generates an HTTP response including only the URL that corresponds to the material element whose importance level is lower than a predetermined reference. Then, the HTTP response is transmitted to the web browser 31 of the user terminal 30, the transmission source of the HTTP request.

An example HTTP response in this case is shown in FIG. 15.

The importance level is an index value used to determine whether the main information 19a is included in the range of the access rights possessed by the user. That is, when the importance level, such as the metadata 19b shown in FIG. 5, is set for the main information 19a (education material: B, static image: C, movie: A, narration: B, where the importance level is reduced in alphabetical order with A being the highest), only the main information 19a that is equal to or lower than importance level B is transmitted to the guest user in response to an HTTP request. The metadata 19b concerning this information is transmitted instead of the main information 19a, which has an importance level A.

Therefore, when the user tries to access the URL of edu.html, i.e., when an HTTP request for edu.html is issued, in the example in FIG. 15 the importance level A of the movie is higher than reference B, and an HTTP response includes metadata 19*b* "Abstract" instead of the URL of the movie itself. This HTTP response also includes contact.html including a user registration form.

When the user enters the user ID and the password in the user registration form and returns it via the web browser 31, the user agent determination module 12 adds the user ID and the password pair to the user register 14 as a registered user. An example user register 14 in this case is shown in FIG. 16.

2-3) When the transmission source of the HTTP request is a registered user:

When the transmission source of the HTTP request is a registered user, the user agent determination module 12 transmits, to the official response generation module 15, the URL of the requested education material and an instruction for the generation of a response to the registered user. The official response generation module 15 distributes edu.html to the requesting source as an HTTP response.

As is described above, when access rights are designated for the main information 19*a* stored in the web site 10, and when the HTTP request for accessing the main information 19*a* is received from a user agent who does not possess the access rights, the web site 10 can transmit, as an HTTP response, the metadata 19*b* describing the main information 19*a*, instead of the main information 19*a*. Thus, since the web site 10 can provide the HTTP request transmission source information concerning the main information 19*a*, the acquisition of the access rights for the main information 19*a* can be requested. Even when the transmission source of the HTTP request is a user who does not possess access rights, at the least, information can be obtained for explaining the contents of the main information 19*a*. Thus, no case occurs wherein no information is acquired, and if needed, access rights can be acquired to obtain the main information 19*a*.

Furthermore, when the transmission source of the HTTP request is the robot of the robot search engine 20, the metadata 19*b*, describing the main information 19*a* that can not originally be accessed, can be obtained, so that the main information 19*a* can be added to the search list. Therefore, the main information 19*a* can be searched for by the search engine 20, and for the web site 10, the main information 19*a* can be advertised.

In the above example, the user obtains access rights for the main information 19*a* by user registration. However, this embodiment can be applied for a case wherein the main information 19*a* is provided by the payment of a fee.

That is, when an appropriate subscription system is employed and when access to the main information 19*a* is permitted for a user who has paid an information charge (a browsing fee, etc.), instead of the main information 19*a*, the metadata 19*b* for the main information 19*a* would be transmitted to a user who did not pay the fee. In this case, the user agent determination module 12 would determine whether or not the transmission source of the HTTP request was a user who had paid the charge for the main information 19*a*.

With this system, the web site 10 can advertise the main information 19*a*, which is subscription information, and the user can, at the least, obtain at no cost information concerning the subscription information.

As is described above, according to the present invention, metadata concerning information for which access is limited can be provided in accordance with an access request issued by a robot search engine to a site that limits access.

Furthermore, according to the present invention, appropriate information can be selectively provided, by a site that limits access, in accordance with the access right of the source that issues an access request for information for which access is limited.

Description of the Symbols is repeated herein for quick reference.

10: Web site
11: Web server
12: User agent determination module
13: User agent register
14: User register
15: Official response generation module
16: Preview response generation module for guest user
17: Preview response generation module for non-registered user
18: Response generation module for search engine
19: Data management system
19*a*: Main information
19*b*: Metadata
20: Search engine
30: User terminal
31: Web browser Having described embodiments of the invention it is noted that modifications and variation can be made by persons skilled in the art in light of the above teachings. It is therefore to be understood that changes may be made in the particular embodiments of the invention disclosed which are within the scope and spirit of the invention as defined by the appended claims.

What is claimed is:

1. A system established in a communication network comprising:
    a data manager, for storing restricted information for a first set of subscribers, partial restricted information for a second set of subscribers, and metadata describing the restricted information for non-subscribers and search engine robots;
    a transmission source determiner, for receiving an access request to the data manager from a transmission source, and for determining whether the transmission source is one of the first set of subscribers, the second set of subscribers, a non-subscriber, or a search engine robot; and
    a response unit, for
        if the transmission source determiner determines that the transmission source is a member of the first set of subscribers, transmitting said restricted information to the transmission source through the communication network,
        if the transmission source determiner determines that the transmission source is a member of the second set of subscribers, transmitting said partial restricted information to the transmission source through the communication network, and
        if the transmission source determiner determines that the user is one of the non-subscribers or search engine robots, transmitting said metadata to the transmission source through the communication network;
    wherein the first set of subscribers has full unrestricted access to an information site;
    wherein the second set of subscribers has partially restricted access to the information site; and wherein the metadata comprises an automatically generated statement describing the subject matter and type of the restricted information, a keyword indicative of the content of the restricted information for preparing a search engine keyword index, and subscription information describing how to join at least one of the first set of subscribers or the second set of subscribers.

2. The system according to claim 1 further comprising:
an information communication terminal, for accessing the information site on the communication network, and for obtaining information available at said information site; wherein a request for said information and identification information for said information communication terminal is transmitted to acquire said information; wherein when said information falls in an access right range that is set in accordance with said identification information, said restricted information is provided by said information site; and wherein when said information does not fall in said access right range, metadata for describing said restricted information is provided.

3. The system according to claim 2, wherein said metadata obtained from said information site is text data for explaining said information.

4. A system provided in a communication network comprising:
a data manager, for storing restricted information to be provided across said communication network;
a transmission source determiner, for ascertaining the type of a transmission source from which an access request is received; and
a response unit, for (a) acquiring from said data manager information correlating with said type obtained in accordance with the determination made by said transmission source determiner, and for (b) generating and returning a response consonant with said type,
wherein said data manager stores restricted information and metadata for describing said restricted information; and
wherein, as the result of the determination by said transmission source determiner, when said transmission source has no right of access for said restricted information, said response unit obtains said metadata for generating a metadata response;
wherein, when said transmission source comprises a robot in a robot search engine that is launched across said communication network, said response unit generates the metadata response comprising the metadata;
wherein said transmission source determiner includes a user agent register, wherein said robot and a user agent header that said robot adds to said access request are registered in said user agent register as correlating with each other; and wherein when said user agent header is registered in said user agent register, said transmission source determiner determines said transmission source to be said robot; and
wherein said metadata comprises an automatically generated statement describing the subject matter and type of the restricted information, a keyword indicative of the content of the restricted information for preparing a search engine keyword index, and subscription information describing how to gain access to said restricted information.

5. The system according to claim 4, wherein each access right of a user for said restricted information is registered in the user register; wherein when a user ID and said access request are received and registered in said user register, said transmission source determiner notifies said response unit of a range of said access rights of said user indicated in said user register; and wherein said response unit generates a metadata response comprising text data for describing said main information, in accordance with said range.

6. A robot search engine response system comprising:
a transmission source determiner, for analyzing an access request received by a web server provided on a communication network, and for identifying said transmission source of said access request; and
a response unit, for, when said transmission source comprises a robot of a robot search engine, transmitting metadata concerning a web page source to said robot;
wherein the web page source is associated with the access request;
wherein said transmission source determiner comprises a user agent register, wherein said robot and a user agent header that said robot adds to said access request are registered in said user agent register as correlating with each other;
wherein when said user agent header is registered in said user agent register, said transmission source determiner determines said transmission source to be said robot; and
wherein said metadata comprises an automatically generated statement describing the subject matter and type of restricted information, a keyword indicative of the content of the restricted information for preparing a search engine keyword index, and subscription information describing how to gain access to said restricted information.

7. A robot search engine registration method comprising the steps of:
mechanically accessing a web site via a communication network and obtaining a web page source stored at said web site;
accepting an access request from a robot of a robot search engine that prepares a web page search list; and
transmitting to said robot a keyword concerning said web page source;
wherein, when the access of said web page source is limited, and when access by said robot is not permitted, text data is transmitted;
the text data comprising metadata having an automatically generated statement describing the subject matter and type of web page source, a keyword indicative of the content of the web page source for preparing a search engine keyword index, and subscription information describing how to gain access to the web page source.

8. A storage medium on which input means of a computer stores a computer-readable program that permits said computer to perform:
a process for analyzing an access request received by a web server that is provided on a communication network and for determining a transmission source of said access request; and
a process for, when said transmission source of said access request comprises a robot of a robot search engine, transmitting a keyword concerning a web page source to said robot;
wherein said web page source is associated with said access request;
wherein, when the access of said web page source is limited, and when access by said robot is not permitted, said program transmits text data;
the text data comprising metadata having an automatically generated statement describing the subject matter and type of web page source, a keyword indicative of the content of the web page source for preparing a search engine keyword index, and subscription information describing how to gain access to the web page source.

9. A program storage device comprising:

storage means for storing a computer-readable program that permits said computer to perform a process for analyzing an access request received by a web server that is provided on a communication network and for determining a transmission source of said access request, and a process for, when said transmission source of said access request comprises a robot of a robot search engine, transmitting a keyword concerning a web page source to said robot; and transmission means for reading said program from said storage means and for transmitting said program;

wherein said web page source is associated with said access request;

wherein, when the access of said web page source is limited, and when an access by said robot is not permitted, said program transmits said text data;

the text data comprising metadata having an automatically generated statement describing the subject matter and type of web page source, a keyword indicative of the content of the web page source for preparing a search engine keyword index, and subscription information describing how to gain access to the web page source.

* * * * *